UNITED STATES PATENT OFFICE.

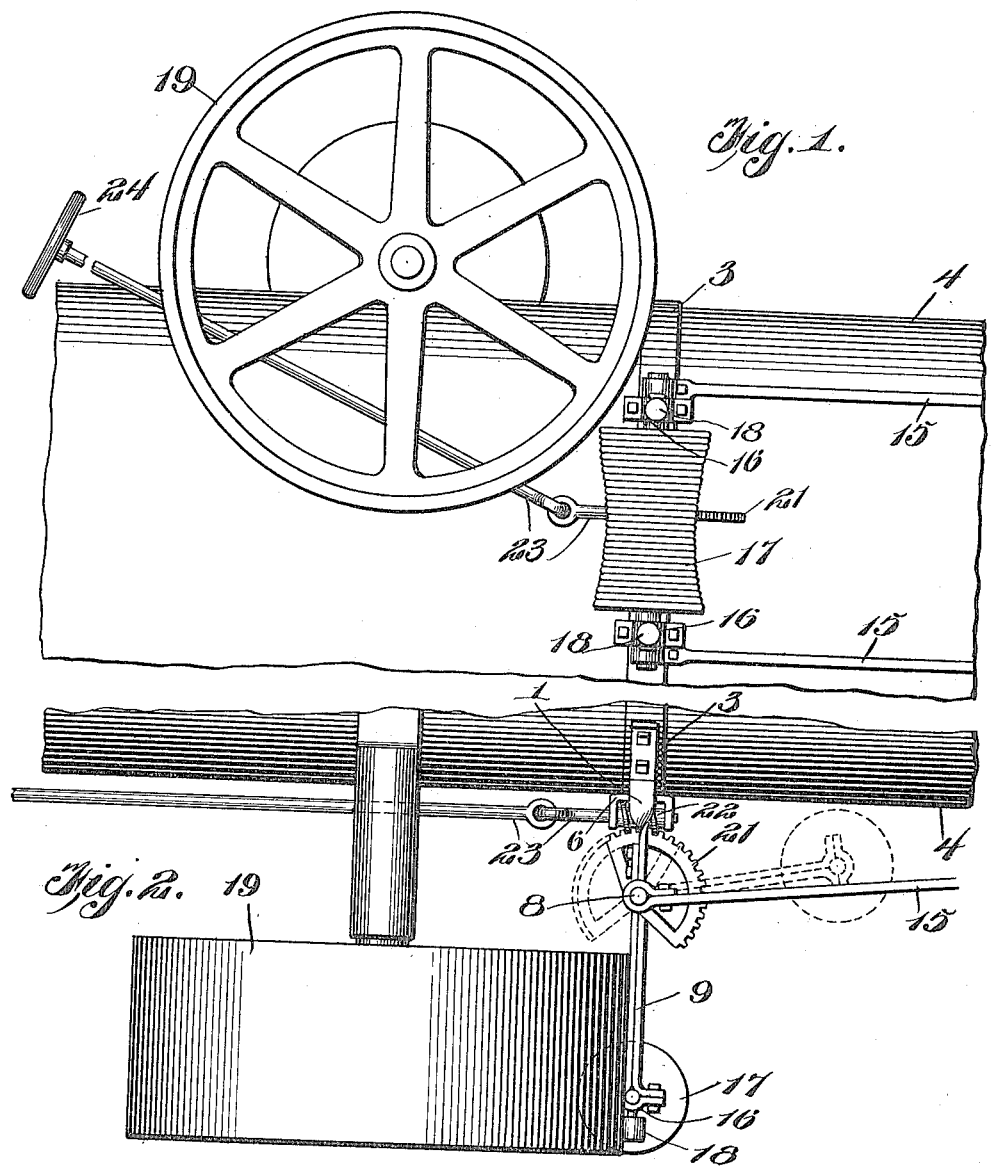

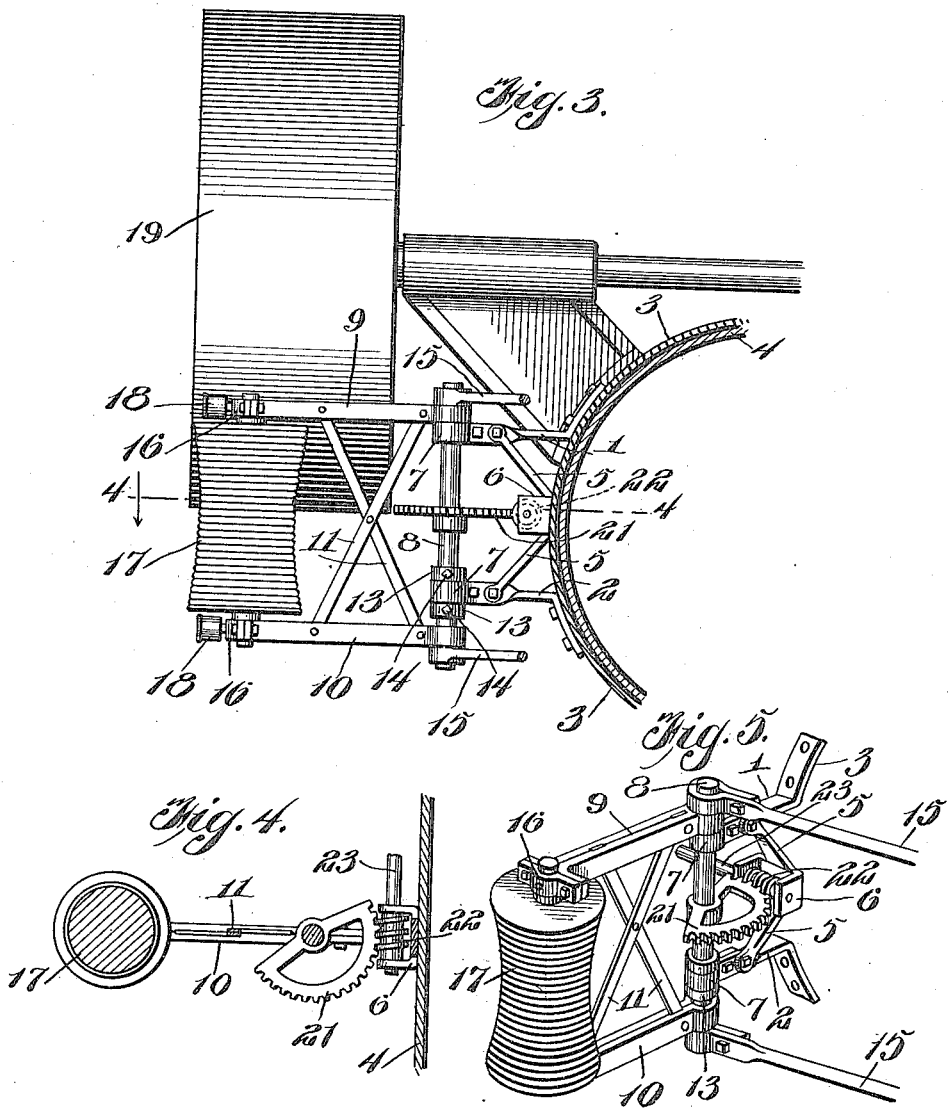

HENRY F. DEDRICK, OF HOWARD LAKE, MINNESOTA.

BELT SHIFTER AND GUIDE FOR TRACTION-ENGINES.

1,146,055.

Specification of Letters Patent. Patented July 13, 1915.

Application filed July 3, 1914. Serial No. 849,012.

*To all whom it may concern:*

Be it known that I, HENRY F. DEDRICK, a citizen of the United States, residing at Howard Lake, in the county of Wright and State of Minnesota, have invented new and useful Improvements in Belt Shifters and Guides for Traction-Engines, of which the following is a specification.

This invention relates to a belt shifter and guide for traction engines, designed for use in controlling a belt running from the drive wheel or pulley of the engine to the pulley or pulleys of a threshing machine or other machine to be driven from the traction engine, the primary object of the invention being a simple, reliable and efficient and easily controlled device for this purpose.

A further object of the invention is to provide a belt shifter and guide which may be applied to any ordinary type of traction engine, and which may be readily and conveniently adjusted by the engineer from his usual position, to guide the belt and prevent it from casually running off at the inner side of the drive pulley, while permitting it to be thrown off at the outer side of the drive pulley.

The invention consists of the features of construction, combination and arrangement of parts herein fully described and claimed, reference being had to the accompanying drawings in which:—

Figure 1 is a side elevation of a portion of a traction engine showing the application of the invention. Fig. 2 is a top plan view thereof, showing in full and dotted lines different positions of the shifter and guide pulley. Fig. 3 is a vertical transverse section through the traction engine, showing only necessary features, and looking toward the shifter and drive wheel. Fig. 4 is a horizontal transverse section on line 4—4 of Fig. 3. Fig. 5 is a perspective view of the device detached from the traction engine.

In carrying my invention into practice, I provide a supporting bracket composed of upper and lower horizontal arms 1 and 2, and preferably formed of strap metal, the said arms being attached at their inner ends to a supporting band 3, which is fastened about the boiler 4 of the traction engine. These arms are reinforced from the band by angularly disposed brace rods 5, and secured to the band between the bracket arm is a bearing block 6, for a purpose hereinafter described.

The outer ends of the arms 1 and 2 are formed to provide bearings 7 for a vertical shaft 8, carrying a swinging frame composed of upper and lower horizontal arms 9 and 10 reinforced by brakes 11, the said shaft being held from longitudinal displacement by collars 13 secured in position by set screws 14, and being reinforced from the engine structure by bracing rods 15 having eyes engaging said shaft and in which the shaft is free to turn.

The swinging frame is adapted to turn or rotate with the shaft in an arc extending in a general direction transversely of the engine, and the arms 9 and 10 thereof are provided at their outer ends with bearings 16 for the shaft terminals of a vertically disposed belt shifting and guiding pulley 17, the bearings being provided with suitable oil cups 18. As shown, the pulley 17 is disposed in advance of the drive pulley 19 of the traction engine and is arranged to engage one of the longitudinal edges of the lower stretch of the drive belt (not shown) which passes around the drive wheel 19, so that by swinging said pulley 17 laterally the belt may be held from moving sidewise inwardly on the drive wheel 19 or shifting from the loose to the fast pulley on the drive shaft of the threshing machine or other element to be driven.

As shown the pulley is preferably grooved and longitudinally flared, being of minimum diameter at the center and maximum diameter at each end, whereby vertical displacement of the belt is prevented, while a positive engagement of the pulley with the belt is insured. When the pulley 17 is swung outwardly it shifts the belt outward across the face of the drive wheel 19, so that it may be properly disposed upon the drive wheel or entirely thrown off said wheel, while when said pulley 17 is swung inwardly the belt is permitted to move inwardly across the face of the drive wheel 19, the pulley 17 also preventing the belt from shifting inwardly beyond a predetermined degree. For the purpose of rotating the shaft 8 and swinging to shift the frame and pulley, I provide upon said shaft a gear sector 21 meshing with a worm gear 22 on a control shaft 23 leading back to a hand wheel 24, whereby said shaft may be turned to swing the shifter in a lateral direction inwardly or outwardly, as will be readily understood. The control shaft may, if desired, consist of two angularly related sections connected by suitable gears or a flexible joint, as may be necessary in properly mounting said shaft upon the engine to dispose the control wheel in position for convenient manipulation.

The device normally prevents the belt from casually running off at the inner side of the drive wheel, while enabling it to be thrown off at the outer side of the drive wheel, whenever desired.

From the foregoing description, the construction and mode of operation of my improved belt shifter and guide are readily understood, and it will be seen that the invention provides a device of this character which is simple of construction, reliable and efficient in operation, and capable of application to any ordinary traction engine. It will also be seen that by means of the control mechanism described the shifter pulley may be adjusted laterally inwardly and outwardly with relation to the direction of movement of the belt to effect adjustments of the belt for the purposes described as well as to maintain the belt in its adjusted position.

I claim:—

The combination with a traction engine and its drive wheel, of a supporting band embracing the engine boiler, a bracket carried by said band, said bracket including upper and lower horizontal, lateral projecting arms and angularly disposed brace rods connecting the same with the band, a bearing block carried by said bracing arms, a vertical shaft journaled upon the bracket arms, arms fixed to and projecting laterally from said shaft, a pulley journaled upon the outer ends of said arms for guiding and shifting engagement with a belt driven from the drive wheel, crossed braces uniting the pulley carrying arms between the pulley and the shaft, a worm journaled upon the bearing member, a gear upon the shaft and meshing with said worm, and means for imparting motion to the worm to swing the gear and shaft in opposite directions.

In testimony whereof I affix my signature in presence of two witnesses.

HENRY F. DEDRICK.

Witnesses:
G. G. LUHMAN,
JOHN ZECH.

Copies of this patent may be obtained for five cents each, by addressing the "Commissioner of Patents, Washington, D. C."